July 7, 1931.                W. DE GROFFT                1,813,031
                              AWNING HOOK
                           Filed May 29, 1928

WITNESSES:                                  INVENTOR:
  Gerhard Bamle                             Will De Grofft,
                                         BY
                                            Joshua R. H. Potts
                                              ATTORNEY.

Patented July 7, 1931

1,813,031

UNITED STATES PATENT OFFICE

WILL DE GROFFT, OF WOODSTOWN, NEW JERSEY

AWNING HOOK

Application filed May 29, 1928. Serial No. 281,428.

My invention relates to attaching hooks and more particularly to a hook for attaching awnings and the like to their supports.

The object of the invention is to provide a hook adapted to receive an eyelet and having means for preventing the eyelet from being unintentionally removed from the hook.

The invention comprises a hook member having means for attaching the same to a support and provided at the free end of the hook member with a re-bent portion for preventing the disengagement from the hook of a member attached thereto. The hook may have a downwardly and an upwardly directed portion ending in a point and the means thereon for preventing disengagement of a member attached to the hook may consist of a continuation of the hook bent into parallelism with the upwardly extending portion of the hook for a certain distance and then diverging outwardly therefrom and curved into a loop.

This re-bent portion may be of resilient material and may be used in connection with an eyelet attached to the member to be held by the hook and the curved end of the re-bent portion may extend a sufficient distance from the hook proper to overlap the portion of the eyelet opposite to that resting in the trough of the hook.

One form of the invention is illustrated in the accompanying drawings in which

Figure 1:
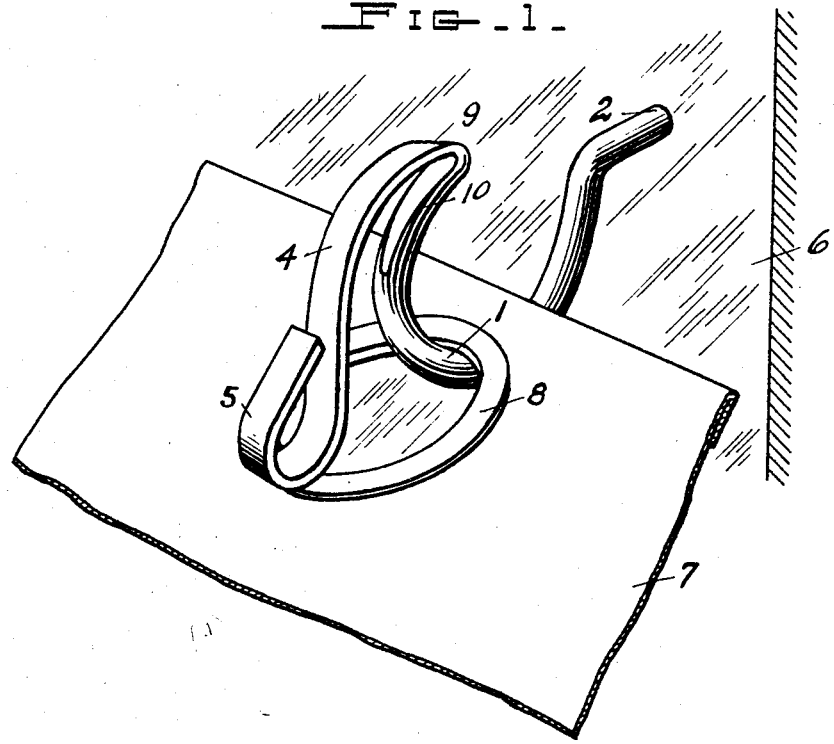
Figure 1 is a perspective view of a hook constructed according to my invention, showing it attached to the wall of a building and supporting an awning shown fragmentarily.
Figure 2:
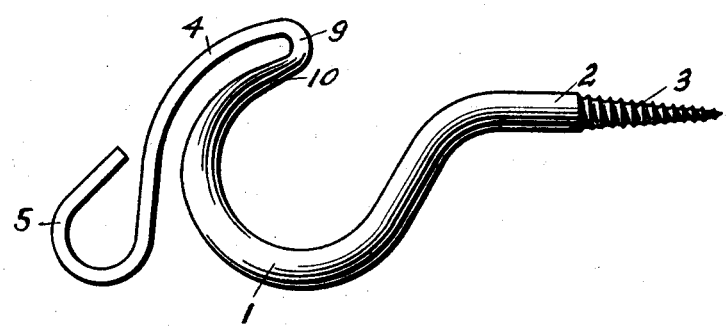
Figure 2 is a side view of the hook shown in Figure 1.

Referring now more in detail to the drawings, the hook has a body part 1 which may be of any desired contour and which merges into the attaching end 2 which has a threaded point 3. The other end of the body part merges into a spring member 4 which is formed by bending the material from which the hook is formed through an angle of substantially 180° shaping it for part of its length to substantially conform to the contour of the body part, as shown in Figure 2, and having its free end bent into a loop 5.

After the hook has been secured in a wall or other support 6, an awning 7 may be secured thereto by placing one of its eyelets 8 over the point 9 of the hook and passing it downwardly until the inner edge of the eyelet contracts with the inside of the body part and the outside of loop 5. A slight downward pressure will force the eyelet over loop 5 which immediately springs outwardly and prevents the eyelet from leaving the hook under influence of the wind, as often happens when ordinary hooks are employed. To remove the eyelet form the hook, loop 5 is sprung toward the body of the hook and the eyelet lifted over the loop.

By providing an awning with eyelets whose inside diameter is slightly less than the distance between the inside of the body part and the outside of loop 5, the awning may be removed by pulling it outwardly to draw the eyelet against the inside of the front of the hook and then lifting it so that the inside edge of the eyelet abuts the arcuate underside of loop 5 and automatically springs the loop inwardly as the eyelet passes over it.

In order to produce threads 3, the body of the hook and end 2 are preferably formed from round stock, but such material forms a stiff spring member. Consequently, I prefer to flatten the outer part 10 of the hook and all of spring member 4 so that loop 5 may be easily moved toward the body part of the hook.

It is to be understood that the above described invention may be modified in various ways within the spirit of the invention, as hereinbefore disclosed and as hereinafter claimed.

I claim:

1. A hook adapted to receive an eyelet of a predetermined inside diameter, means for securing the eyelet in the hook including a spring member extending in reverse direction from the point of the hook and having its free end spaced from the hook a distance greater than the inside diameter of the eyelet.

2. A hook adapted to receive an eyelet, means for securing an eyelet in the hook comprising a spring member extending from the point of the hook in substantial parallelism to the hook for a part of its length and then turned outwardly from the hook.

3. A hook adapted to receive an eyelet, means for securing an eyelet in the hook including a spring member extending from the point of the hook substantially parallel to the hook for a part of the length of the hook and then outwardly forming a loop adapted to engage the eyelet.

In testimony whereof I have signed my name to this specification.

WILL DE GROFFT.